(12) United States Patent
Bandis

(10) Patent No.: US 6,505,743 B1
(45) Date of Patent: Jan. 14, 2003

(54) UNITARILY-FORMED GRIT CLASSIFIER TANK AND BEARING

(75) Inventor: Steven D. Bandis, West Jordan, UT (US)

(73) Assignee: Envirotech Pumpsystems, Inc., Salt Lake City, UT (US)

( * ) Notice: Subject to any disclaimer, the term of this patent is extended or adjusted under 35 U.S.C. 154(b) by 0 days.

(21) Appl. No.: 09/652,879

(22) Filed: Aug. 31, 2000

(51) Int. Cl.[7] .................................................. B03B 5/40
(52) U.S. Cl. ...................................... 209/173; 209/464
(58) Field of Search ............................... 209/172.5, 172, 209/173, 461, 463, 464, 919, 492, 505, 503; 384/276

(56) References Cited

U.S. PATENT DOCUMENTS

| | | | | |
|---|---|---|---|---|
| 533,821 | A | * 2/1895 | Montgomery | ............... 209/427 |
| 1,688,678 | A | * 10/1928 | Altamirano | |
| 2,025,841 | A | * 12/1935 | Young | |
| 2,368,416 | A | * 1/1945 | Holt | |
| 2,468,005 | A | * 4/1949 | Walker et al. | ............... 209/173 |
| 2,559,403 | A | * 7/1951 | Cover | ......................... 209/173 |
| 2,635,104 | A | * 4/1953 | Chayen | ...................... 209/173 |
| 2,713,945 | A | * 7/1955 | Fontein | ................... 209/172.5 |
| 2,718,966 | A | * 9/1955 | Hardinge | .................... 209/173 |
| 3,000,503 | A | * 9/1961 | Reck | ........................... 209/173 |
| 3,043,430 | A | * 7/1962 | Gish | ........................... 209/464 |
| 3,115,281 | A | * 12/1963 | Somme | ....................... 222/184 |
| 3,221,881 | A | * 12/1965 | Weiler et al. | ................ 210/136 |
| 3,241,701 | A | * 3/1966 | Boggs | ........................ 220/4.13 |
| 3,506,485 | A | * 4/1970 | Plaven | ......................... 127/25 |
| 3,662,918 | A | * 5/1972 | Crawford et al. | .......... 220/85 R |
| 3,865,727 | A | 2/1975 | Broling et al. | |
| 4,272,363 | A | * 6/1981 | Cargile, Jr. | .................. 209/464 |
| 4,274,893 | A | * 6/1981 | Purvis | ......................... 210/320 |
| 4,274,963 | A | * 6/1981 | Purvis | ......................... 209/464 |
| 4,871,449 | A | 10/1989 | Lott | |
| 4,946,306 | A | * 8/1990 | Yodock | ........................... 404/6 |
| 5,107,872 | A | * 4/1992 | Meincke | ....................... 134/56 |
| 5,230,569 | A | 7/1993 | Sheedy | |
| 5,368,731 | A | 11/1994 | Pesotini | |
| 5,758,977 | A | * 6/1998 | Bickle et al. | ................ 384/276 |
| 6,228,258 | B1 | * 5/2001 | Donald et al. | .............. 210/195 |

FOREIGN PATENT DOCUMENTS

EP 0 228 724 A2 * 12/1985
EP 0 322 688 A2 * 12/1987

* cited by examiner

Primary Examiner—Donald P. Walsh
Assistant Examiner—Joseph Rodriguez
(74) Attorney, Agent, or Firm—Morriss, Bateman, O'Bryant & Compagni (57) ABSTRACT

A grit classifier of the type used in a variety of industrial applications to separate grit or particulate matter from a feed slurry is disclosed, the grit classifier being unitarily-formed in one or two pieces of moldable plastic or plastic-like material which renders the grit classifier more easily and cost-effectively manufactured. The grit classifier of the present invention is also advantageously easy to transport to a site, thereby further reducing the costs of use. Also disclosed is an auger beating assembly for use in the unitarily-formed grit classifier tank of the present invention which is simply structured and adaptable to any screw auger type or size.

45 Claims, 7 Drawing Sheets

UNITARILY-FORMED GRIT CLASSIFIER TANK AND BEARING

BACKGROUND OF THE INVENTION

1. Field of the Invention

This invention relates to classifier tanks used for separating particulates, or grit, from a liquid slurry and specifically relates to classifiers constructed to be easily transportable and economically made.

2. Description of Related Art

Grit classifiers are commonly used in a variety of industries, such as mining, municipal wastewater treatment and pulp and paper processing, to process liquid slurries for separation of the solids component from the liquid component of the slurry. More specifically, however, grit classifiers are employed to remove particulate matter or grit from such slurries. "Grit" typically includes inorganic particulates such as sand, dust or smaller mesh rocks or stones. Grit can also include organic material such as cinders, coffee grounds and other vegetal materials. It is important to the processing of industrial slurries to properly remove the grit from the slurry, and to do so in a manner which will avoid fouling the classifier equipment.

Grit classifiers generally comprise a tank or trough having a screw conveyor or auger positioned therein. The tank or trough is maintained at an angle to the ground. A slurry is introduced into the bottom, or lower, end of the tank, and the screw conveyor is operated to sweep the grit from the reservoir of fluid at the low end of the tank to a solids outlet positioned at the top, or elevated end, of the tank. Many classifier units thus described also act to dewater the grit as the grit is moved by the screw conveyor to the upper portion of the tank. Examples of grit classifiers are disclosed in U.S. Pat. No. 3,865,727 to Broling, et al., U.S. Pat. No. 4,871,449 to Lott and U.S. Pat. No. 5,368,731 to Pesotini.

Conventional grit classifiers are most typically made of a heavy and durable material, such as steel or concrete. They are also conventionally formed of over sixty separate pieces of metal which must then be welded together and secured by fastening means such as screws or bolts. Welding the parts together is very time consuming and, if done incorrectly, can compromise the integrity of the grit classifier. The formation of conventional grit classifiers may typically take about thirty man-hours and may cost several thousand dollars. In addition, the tanks are usually galvanized to increase durability and are then painted with two or more coats of erosion-resistant coating—all of which adds to the cost of manufacturing the grit classifier and increasing manufacturing time.

Another problem commonly encountered in conventional grit classifiers is that of transportation to a site. That is, grit classifiers are often used in industries where sludge processing systems must be brought to the site, such as in mineral and mining operations, and the transportation of conventional heavy metal or steel classifiers to a site is costly. Heavy lifting equipment (e.g., cranes) and large trucks must be employed to lift, transport and then position conventional grit classifiers at a site. To enable portability of grit classifiers, they have conventionally been manufactured in sections, which provides easier transportation of the parts, but which requires assembly at the site. An example of a grit classifier manufactured in sections is disclosed in U.S. Pat. No. 4,871,449. Assembling the grit classifier on site represents a loss of time and manpower.

Thus, it would be beneficial to the art to provide a grit classifier tank which is configured for simple construction, which is easily transportable to a site, which is resistant to degradation under conventional operating conditions and is economically made and used.

BRIEF SUMMARY OF THE INVENTION

In accordance with the present invention, a grit classifier is unitarily-formed from comparatively lightweight moldable materials which enable the grit classifier to be easily manufactured, easily transported to a site and implemented for use without time-consuming or costly assembly. The construction of the grit classifier of the present invention also renders it durable and corrosion-resistant and also provides beneficial improvements in the grit classifier art by facilitating attachment of a screw conveyor or auger to the grit classifier.

The grit classifier of the present invention comprises a unitarily-formed elongated tank having a bottom and upstanding, continuous wall, a fluid outlet formed at one end of the elongated tank for discharging fluid from the tank and a solids discharge outlet formed at the other end of the tank for discharging grit which has been removed from the fluid component of a slurry. The elongated tank is further structured to support a screw conveyor or auger within the tank for removing the grit or solids component from a slurry introduced into the elongated tank. The tank may be formed with an inlet for introducing a slurry into the tank. The grit classifier may include supports or legs unitarily-formed with the elongated tank, although legs may, alternatively, be added to the tank after formation.

The most beneficial aspect of the present invention is its unitary formation from comparatively lightweight, durable materials which render the grit classifier easily transportable and durable. As used herein, "unitary" or "unitarily-formed" means that the tank portion of the grit classifier is formed by means which produce a single component of substantially seamless construction. Depending on the embodiment of the grit classifier of the present invention, the unitarily-formed tank portion may be a single piece or two conjoinable pieces, each of which is unitarily-formed. The present invention thus provides a significant advantage over conventionally-constructed grit classifiers which are constructed of over sixty separate pieces.

The grit classifier of the present invention may be made by any suitable technique which produces a unitarily-formed structure as described herein. A particularly suitable example of such manufacturing means is a rotational molding process using high molecular weight plastics, such as polyethylene, or resinous materials. Rotational molding is a known process which involves introducing flowable plastic or plastic-like materials into a clamshell mold formed to the desired three-dimensional product design and continuously rotating the mold to assure the complete filling of the mold. The clamshell mold is then removed once the plastic has cured and hardened. Other suitable methods may be employed, however. By forming the grit classifier of the present invention in a unitarily-formed construction, there is a significant decrease in cost of manufacture, a significant decrease in manufacturing time (from weeks to days), an elimination of the need for coating the grit classifier because of the durability of the plastic material and a significant decrease in transportation costs and setup time at a given site.

One embodiment of the present invention comprises a single-walled tank of unitary formation which may have support legs additionally molded therewith or, in the alternative, secured to the bottom of the tank thereafter. In a second embodiment of the invention, the tank body is constructed with a double wall having a space therebetween which may be filled at the site with a weighted material, such as heavy-weight foam or cementitious material, to provide added stability to the grit classifier. The tank body may also be formed in two separate sections, generally comprising a pool section and grit discharge section with extension, which allows the discharge section of the grit classifier to be selectively sized for a particular application.

These and other advantages of the present invention will be better understood with reference to the detailed description of the illustrated embodiments disclosed hereafter.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

A first embodiment of the unitarily-formed grit classifier 10 of the present invention is shown in FIGS. 1–10, which also illustrate the general structural elements of the invention common to all embodiments. FIGS. 1, 2, 5 and 6 illustrate that the grit classifier 10 of the present invention is principally comprised of a unitarily-formed elongated tank body 12 having a bottom 14 and a continuous, upstanding wall 16 extending from the bottom 14. The grit classifier 10 further comprises a first end 18 and a second end 20 of the elongated tank body 12. That portion of the tank body 12 located toward the first end 18 defines a pool section 24 into which a slurry is introduced. That portion of the tank body 12 located toward the second end 20 defines a grit drainage section 26 for dewatering and discharging grit removed from the slurry.

As illustrated in FIGS. 1–10, the grit classifier 10 may optionally include a separate guard 28, or cover, which registers with the elongated tank body 12 to provide a substantially closed tank system. The guard 28 may be fitted, however, with screen sections 30 to allow the release of gases from the tank 12 or to provide some aeration of the tank 12. Notably, the embodiment of the grit classifier 10 shown in FIG. 1 does not strictly require a guard 28, the presence or use of which is largely dictated by the application to which the grit classifier 10 is put.

In operation and use, the second end 20 of the grit classifier 10 is elevated above the first end 18 of the grit classifier 10 by means of supports or legs (not shown) which are of unequal height. (See FIGS. 11–16 for illustrative purposes.) The legs or supports located at the first end 18 are shorter in height than the legs or supports located at the second end 20. Alternatively, the first end 18 may be devoid of legs or support such that the first end 18 rests directly on the ground or other supporting surface. The supports or legs may be unitarily-formed with the tank body 12 in a formation process (e.g., rotational molding), or the supports or legs may be separately formed and later secured to the tank body 12. A slurry fluid is introduced into the tank body 12 in the pool section 24 thereof. The slurry may be introduced through the open top of the tank body 12 or through at least one feed slurry box 32 (two such feed slurry boxes 32 being illustrated in phantom in FIG. 1). The feed slurry box 32 or boxes may be unitarily-formed with the tank body 12 or, as suggested by FIG. 1, may be separately formed and secured to the tank body 12.

The first end 18 of the tank body 12 may be configured with a weir extension 34 over which liquid flows, and a trough or launder 36 into which the overflow temporarily collects. The launder 36 is further structured with a fluid outlet 38 through which fluid from the launder 36 is discharged. A second underflow discharge outlet 42 may be formed in the bottom 14 of the tank body 12 in the pool section 24 through which fluid may be drained from the pool section 24.

An auger shaft opening 46 is formed in the second end 20 of the tank body 12 to accommodate the positioning of an auger shaft 48 (shown in phantom in FIG. 2) therethrough. In use, the end 50 of the auger shaft 48 is secured to a motor (not shown) which provides rotation to the auger. A solids discharge outlet 54 is also formed at the second end 20 of the tank body 12. Here, the solids discharge outlet 54 is formed through the bottom 14 of the tank body 12. In use, the grit or solids component of the slurry pooling in the pool section 24 of the tank body 12 settles to the bottom 14 of the grit classifier 10 and the rotating auger lifts and moves the settled grit toward the second end 20 of the tank body 12. The fluid moved with the grit will flow back toward the pool section 24 of the tank body 12 thereby causing a dewatering of the grit by the time the grit is moved and elevated to the solids discharge outlet 54.

Figure 1:
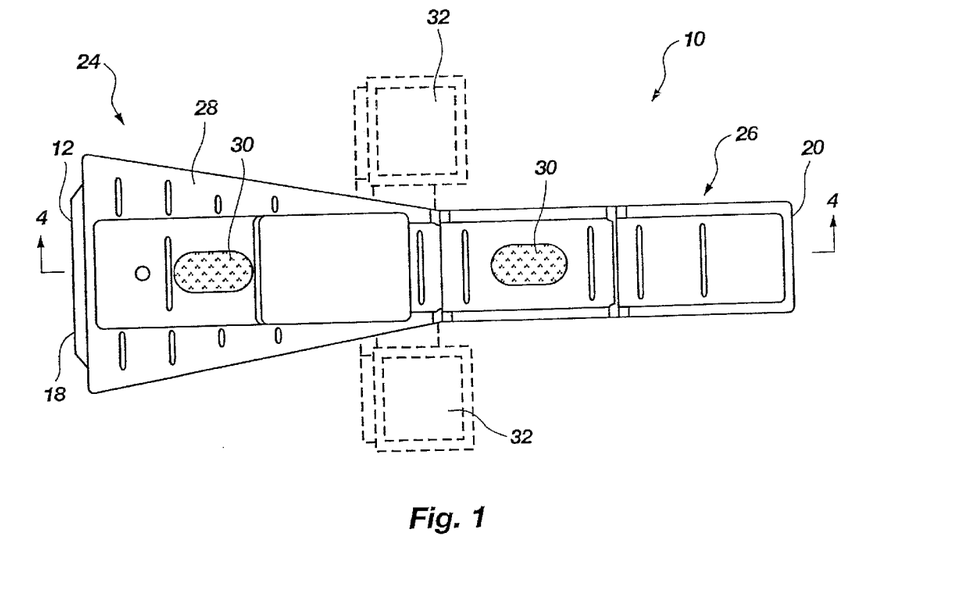
FIG. 1 is a plan view of a first embodiment of the unitarily-formed classifier tank of the present invention.
Figure 2:
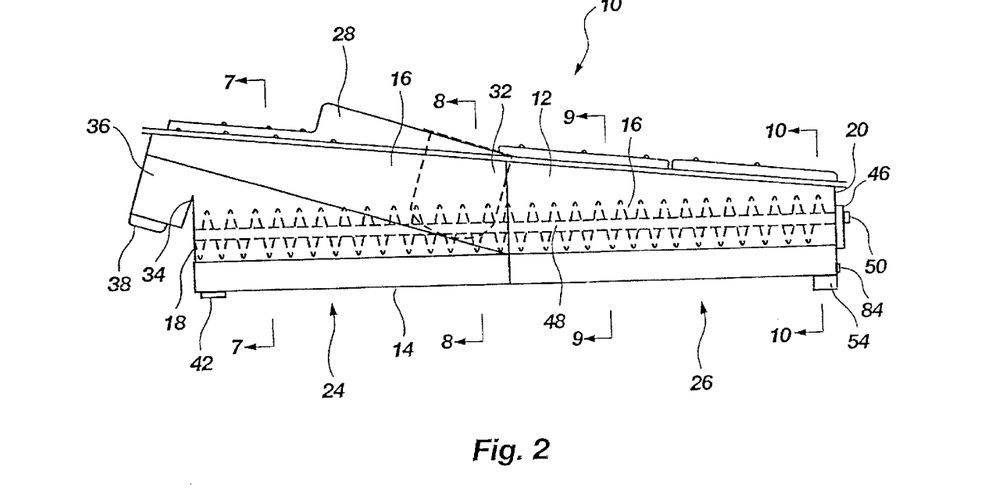
FIG. 2 is a side view in elevation of the embodiment shown in FIG. 1.
Figure 3:
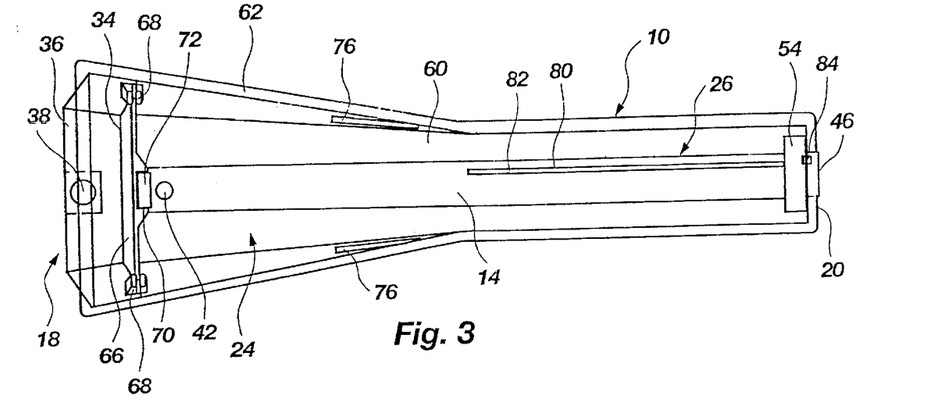
FIG. 3 is a plan view of the classifier tank shown in FIG. 1, with the cover removed to expose the interior of the classifier tank.

FIGS. 3, 4 and 7–10 more clearly illustrate the interior 60 of the grit classifier 10 and one example of the architectural configuration of the unitarily-formed tank body 12. FIG. 3 illustrates the tank body 12 with the guard or cover removed so that the interior 60 of the tank body 12 may be viewed. The tank body 12 may be formed with a peripheral lip 62 against which the guard may register when a guard 28 is used. It can also be seen that the tank body 12, in this exemplar design, is generally wider, or flared, in the area of the pool section 24 of the tank body 12 in comparison to the grit discharge section 26 which may be configured with more parallel-oriented walls. The pool section 24 need not be flared, however, and may have parallel-oriented walls as well.

Figure 4:
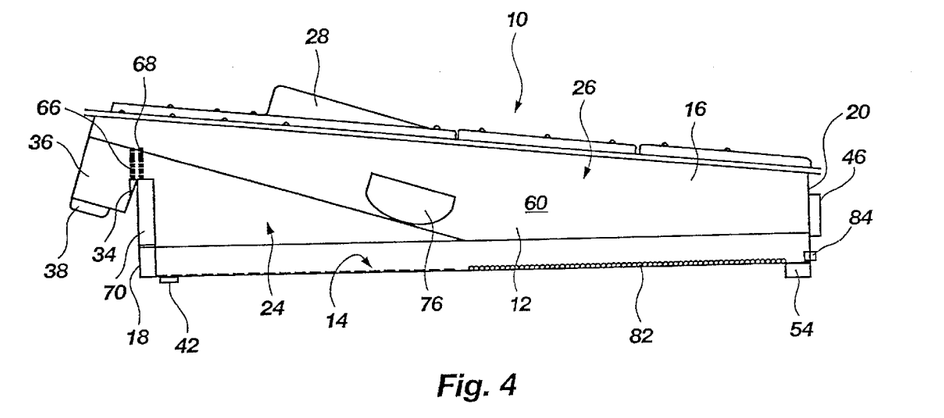
FIG. 4 is a view in cross section of the classifier tank shown in FIG. 1, taken at line 4—4.
Figure 5:
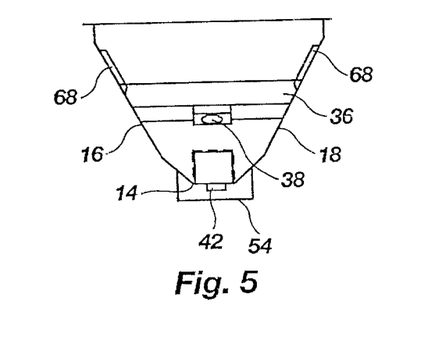
FIG. 5 is a view in elevation of the fluid discharge end of the classifier tank shown in FIG. 3.
Figure 6:
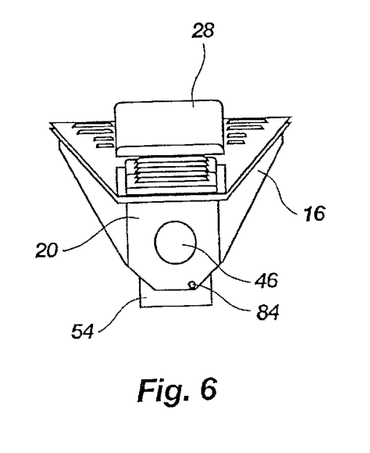
FIG. 6 is a view in elevation of the solids discharge end of the classifier tank shown in FIG. 4.

FIGS. 3 and 4 show that the grit classifier 10 of the present invention may employ a weir 66 which, as shown, may be a separate and removable element of the grit classifier 10 and which is supported on the weir support 34 by weir brackets 68 unitarily-formed as part of the continuous wall 16 of the tank body 12. Although shown as a separate and removable element, the weir 66 may optionally be unitarily-formed or molded as part of the tank body 12. The weir 66 may be configured with a bearing channel 70 into which is slidably received a portion of a bearing assembly (suggested at 72) of an auger. An exemplar bearing assembly for an auger shaft which may be used with the present invention is disclosed more fully below.

Figures 7, 8, 9, 10:
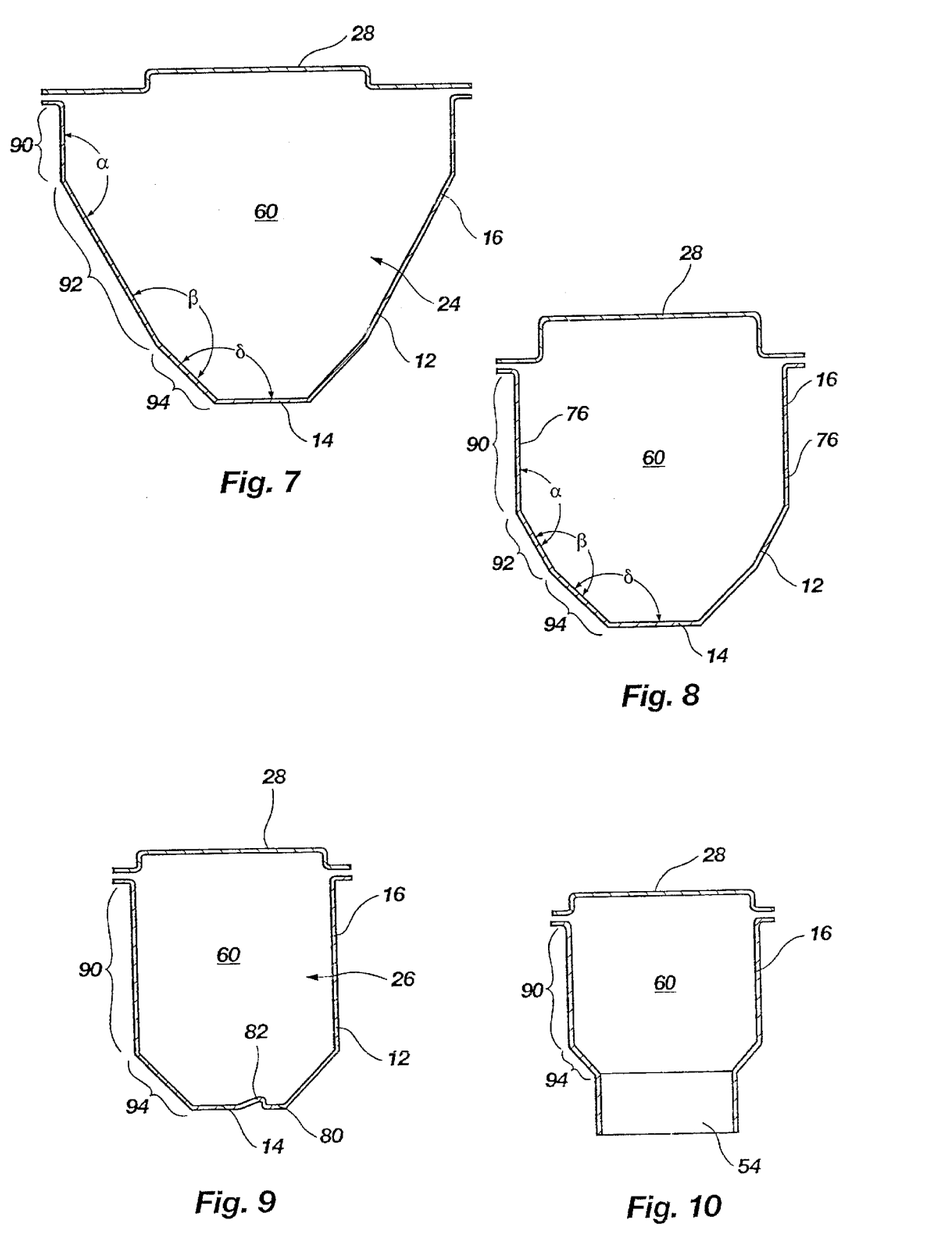
FIG. 7 is a view in lateral cross section of the classifier tank shown in FIG. 2, taken at line 7—7.
FIG. 8 is a view in lateral cross section of the classifier tank shown in FIG. 2, taken at line 8—8.
FIG. 9 is a view in lateral cross section of the classifier tank shown in FIG. 2, taken at line 9—9.
FIG. 10 is a view in lateral cross section of the classifier tank shown in FIG. 2, taken at line 10—10.

FIGS. 3 and 4 further illustrate that feed openings 76 may be formed in the wall 16 of the tank body 12 to which a feed slurry box 32 (FIG. 1) may be unitarily-formed or attached. While two feed openings 76 are shown, only one, or more than two, may be employed in introducing slurry into the interior 60 of the tank body 12. The tank body 12 may be configured, in the grit drainage section 26, with a sluice water return channel 80 which runs longitudinally along the bottom 14 of the tank body 12, as shown in FIGS. 3, 4 and 9. The sluice water return channel 80 may be formed and defined by a ridge 82 (FIG. 9) running longitudinally in the bottom 14 of the tank body 12. When grit is being moved upwardly through the grit discharge section 26 of the grit classifier 10 during operation, the sluice water return channel 80 and ridge 82 operate to keep the grit from settling and compacting in the bottom of the discharge section 26. A sluice water nozzle 84 may be provided in the second end 20 of the tank body 12, in alignment with the sluice water return channel 80, through which sluice water is directed to flush grit and water back down into the pool section 24 of the tank body 12.

While the shape and configuration of the tank body 12 of the present invention may vary, FIGS. 7–10 show but one example of how the grit classifier 10 may be shaped in cross section through the various portions of the tank body 12. FIG. 7 is a lateral cross section view of the pool section 24 of the tank body 12 shown in FIGS. 1 and 2 and it can be seen that the tank body 12 in the pool section 24 is flared. That is, the upstanding wall 16 may comprise a first wall section 90 which is substantially vertical in orientation to the horizontal bottom 14 of the tank body 12, a second wall section 92 which is oriented at a selected angle α to the first wall section 90 and a third wall section 94 which is oriented at a selected angle β to the second wall section 92 and at a selected angle δ to the bottom 14 of the tank body 12. A flared configuration of the pool section 24 of the tank body 12 may be particularly suitable for facilitating the settling of certain types of grit or particulates in a feed slurry. Alternatively, however, it may be desirable to configure the pool section 24 of the tank body 12 with substantially more vertical side walls 16, as suggested by FIG. 8.

FIG. 8 shows the lateral cross section of the tank body 12 at the point of entry of the feed slurry through the feed box openings 76 formed through either wall 16 of the tank body 12. It can be seen that the first wall section 90 has been extended in depth, thereby resulting in the shortening of the second wall portion 82. Again, this configuration of the tank body 12 in the vicinity of the slurry introduction may facilitate pooling of the slurry in the pool section 24. FIG. 9 shows a lateral cross section of the tank body 12 taken through the grit discharge section 26. The figure illustrates how the slurry water return channel 80 and ridge 82 are configured in the bottom 14 of the tank body 12. The first wall section 90 is also greater in depth such that the side walls 16 of the grit discharge section 26 are substantially parallel. The same is true with respect to the cross section of the tank body 12 shown in FIG. 10 which is taken near the second end 20 of the tank body 12. Again, the configuration of the tank shown is only exemplary and is not intended to imply the only means of configuring the grit classifier tank of the present invention.

Figure 11:
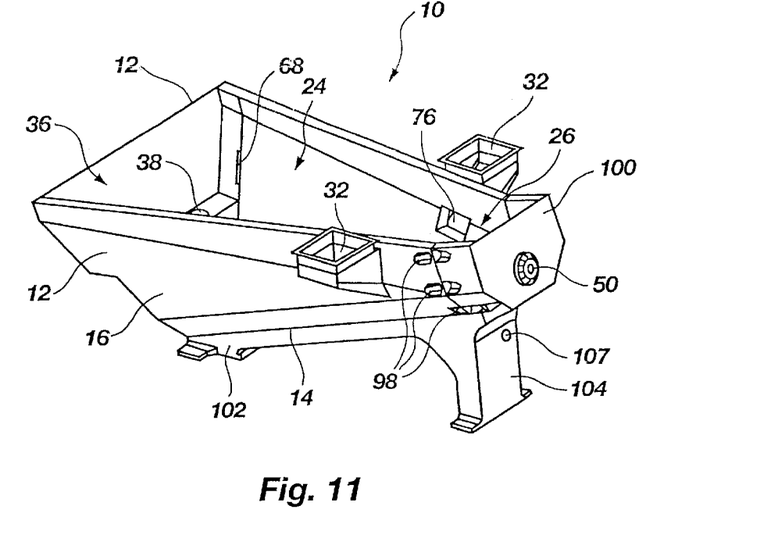
FIG. 11 is a perspective view of a second embodiment of the classifier tank of the present invention.
Figure 12:
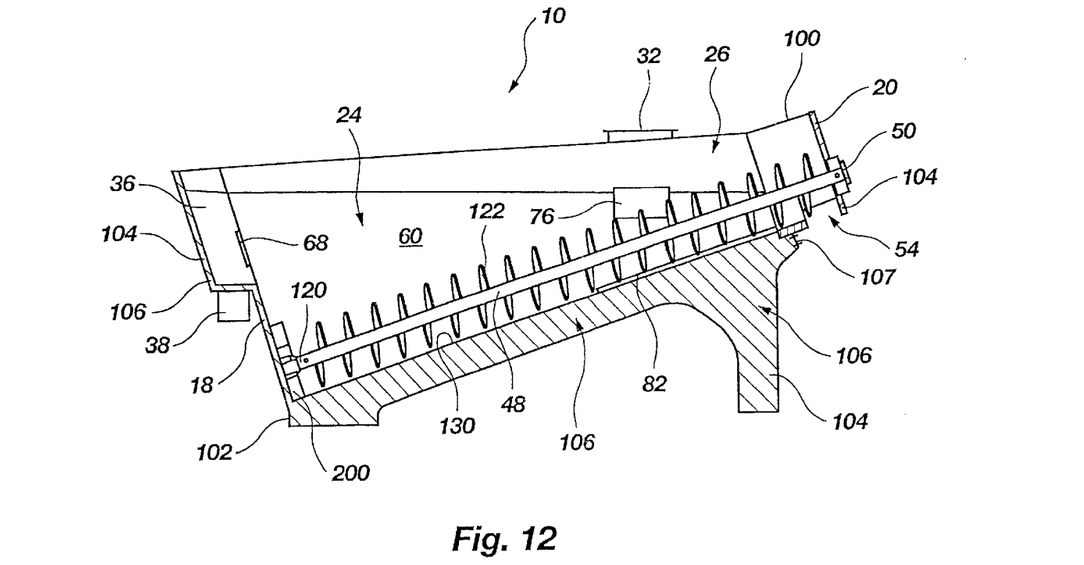
FIG. 12 is a view in cross section of the classifier tank shown in FIG. 11, taken at line 12—12.

The first embodiment of the invention illustrated in FIGS. 7–10 is a single wall, unitary construction which facilitates manufacture of the grit classifier and enables easy transportation to a site. FIGS. 11–16 illustrate alternative embodiments of the invention, the common feature of which is a double wall configuration. As shown in FIGS. 11 and 12, the grit classifier 10 of this embodiment is comprised of two, unitarily-formed sections, the first being the pool section 24 and discharge section 26 of the tank body 12 and the second being a tank extension 100 of the discharge section 26 of the tank body 12. The tank extension 100 is secured to the tank body 12 by securement members 98, which may be unitarily formed as part of the tank body 12 and tank extension 100 structures. The pool section 24 of the tank body 12 includes a front support 102 and a back support 104 which are different in relative height to each other so that the second end of the tank body 12 is elevated above the first end 18 of the tank body 12, thereby facilitating the formation of a pool of liquid in the tank body 12. It can be seen that the tank body 12 of this embodiment has all of the configurational features of the single-wall embodiment previously described, including a launder 36, a fluid discharge outlet 38, weir brackets 68 to hold an insertable weir, feed openings 76 and a slurry water return channel and ridge 82. In this embodiment, the feed slurry boxes 32 may be unitarily-formed with the tank body 12 during the molding or formation process. Alternatively, the feed slurry boxes 32 may be separately formed and secured to the tank body 12 as shown. This embodiment differs from the single-wall embodiment in having the solids discharge outlet 54 positioned in the tank extension 100.

As more clearly seen in FIG. 12, the tank body 12, and optionally the tank extension 100, is configured with a double wall 104 which provides a void 106 between the two walls. The void 106 may be filled, as shown, with a variety of ballasting materials, such as heavy foam or cementitious material. The double wall configuration is formed during the molding process by, for example, using mated clamshell forms which are of disparate sizes. At least one aperture 107 is provided in the tank body through which the ballasting material may be placed or flowed to fill the void 106. The double wall configuration of the present invention provides a significant advantage over conventional grit classifiers in enabling the device to be easily and less expensively transported to a site for use because of its lessened weight, whereafter the void 106 can be filled with ballasting material to stabilize it in place. Construction costs are also significantly reduced.

Figure 13:
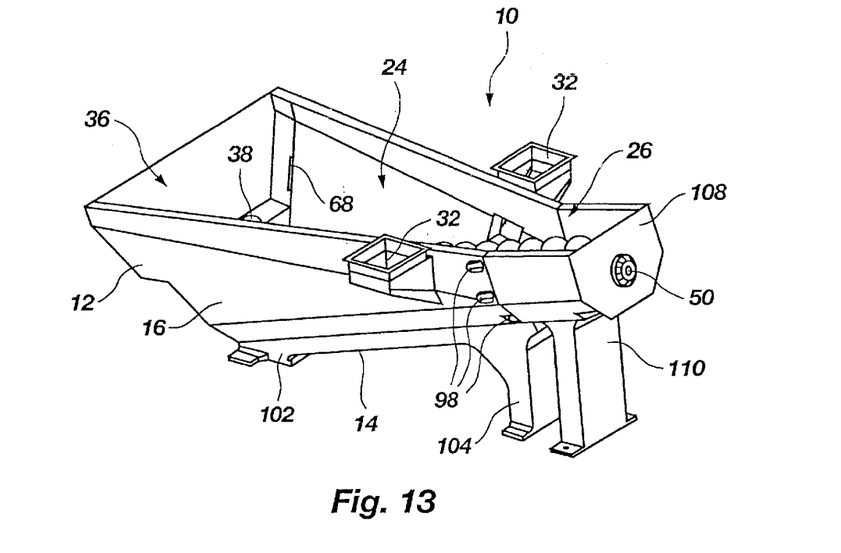
FIG. 13 is a perspective view of a third embodiment of the classifier tank of the present invention.
Figure 14:
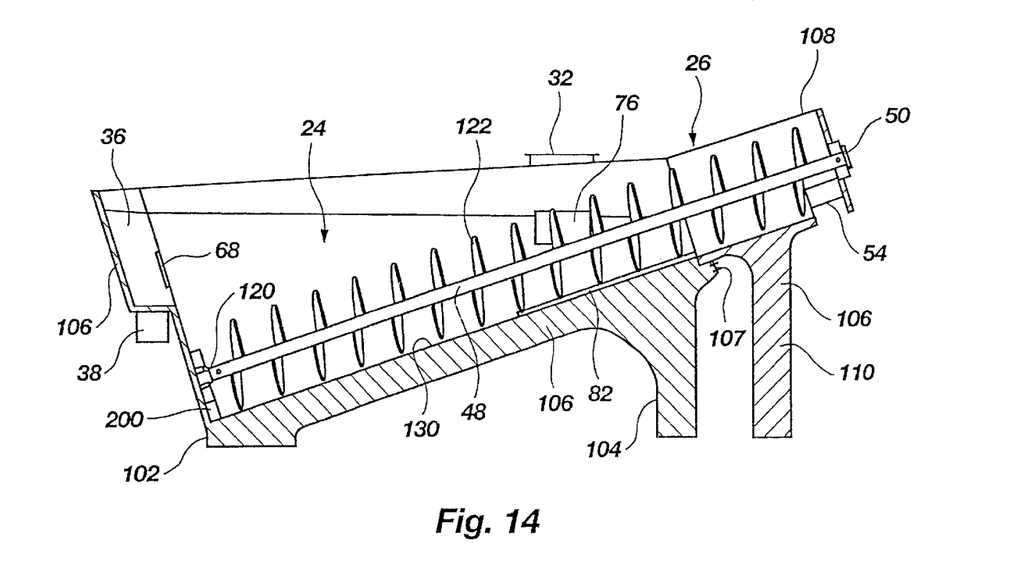
FIG. 14 is a view in cross section of the classifier tank shown in FIG. 13, taken at line 14—14.
Figure 15:
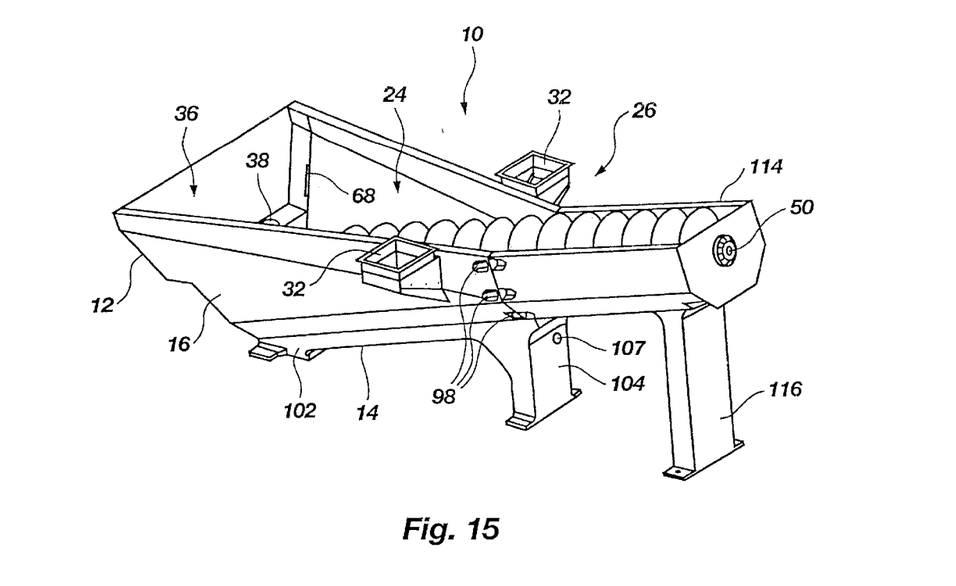
FIG. 15 is a perspective view of a fourth embodiment of the classifier tank of the present invention.
Figure 16:
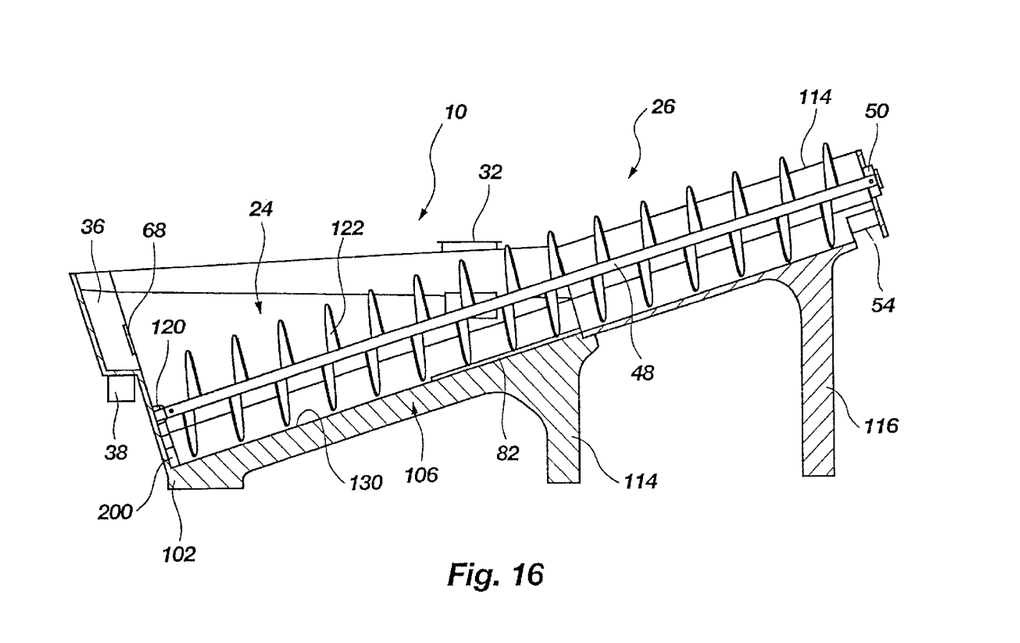
FIG. 16 is a view in cross section of the classifier tank shown in FIG. 15, taken at line 16—16.

FIGS. 13 and 14 illustrate a further embodiment of the present invention where the tank extension 108 is of greater length and is configured with its own support leg 110. The tank extension 108 of this embodiment secures to the tank body 12 by securement means 98, as previously described, and includes the solids discharge outlet 54 therein. Similarly, as shown in FIGS. 15 and 16, the tank extension 114 may be of even greater length and includes its own unitarily-formed support leg 116. FIGS. 11–16 demonstrate that a variety of tank extensions 100, 108, 114 can be sized and configured for attachment to the same size tank body 12, thereby enabling selective sizing of the grit classifier 10 to accommodate a give application and to enable the selection of an appropriate screw auger size as dictated by the particular application.

Figure 19:
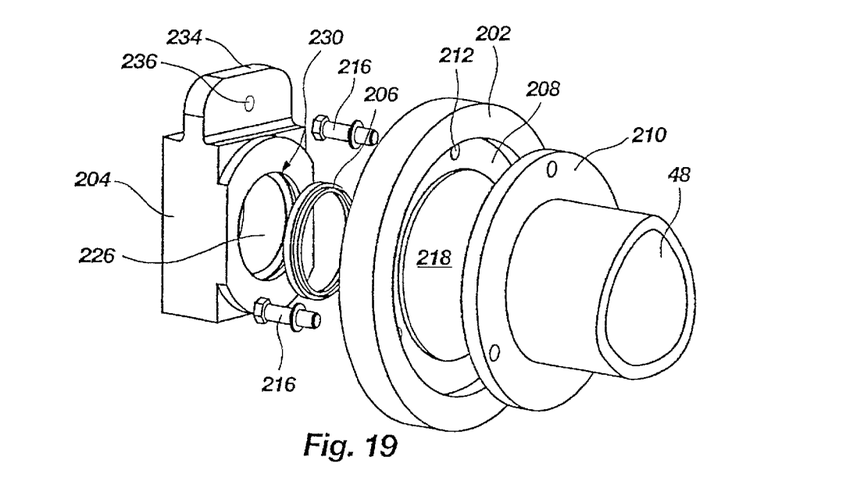
FIG. 19 is an exploded view in perspective of the auger bearing assembly shown in FIG. 17 viewed from the end of the auger shaft.

Each of the tank bodies 12 and associated tank extensions 100, 108, 114 of various sizes are configured to employ a screw auger of selected size, as shown. Additionally, the configuration of the tank body 12 enables the lower end 120 of the screw auger 122 to rest on the bottom 14 of the interior 60 of the tank body 12, thereby eliminating the need for conventional lift-out mechanisms. The ability to rest the screw auger 122 in an elevated manner above the floor 130 of the tank body 12 is particularly facilitated by using an auger bearing assembly 200 of the type described hereinafter and illustrated in FIGS. 17–19.

Figures 17, 18:
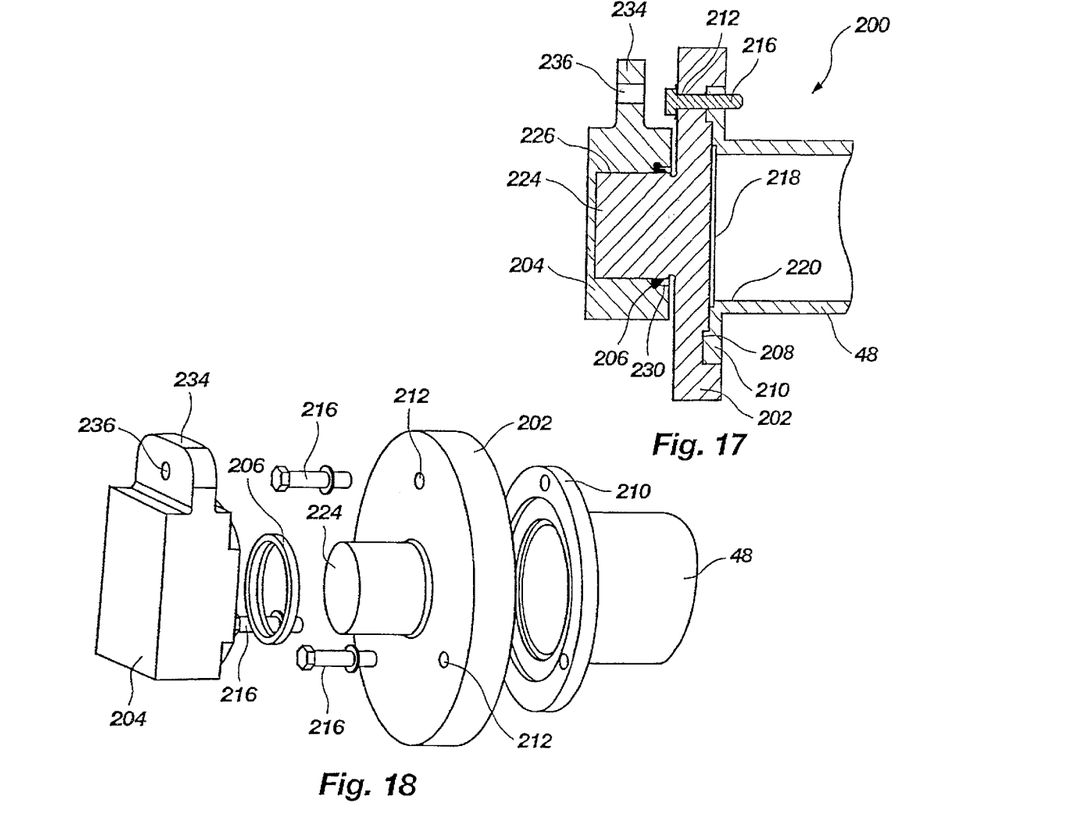
FIG. 17 is a view in cross section of an exemplar auger bearing assembly configured for use in the classifier tank of the present invention.
FIG. 18 is an exploded view in perspective of the auger bearing assembly shown in FIG. 17 viewed from the end of the lip seal housing.

FIG. 17 illustrates an auger bearing assembly 200 which is generally comprised of an auger shaft adaptor 202, a lip seal housing 204 and a lip seal 206. This auger bearing assembly 200 has particular advantages over conventional bearing assemblies used in grit classifiers in having very simple construction (three parts) and being very durable in the abrasive conditions to which such bearings are exposed in the operation of grit classifiers. The auger bearing assembly 200 is easily constructed and inexpensively manufactured, thereby rendering it easily and inexpensively replaced if worn.

The auger shaft adaptor 202 is configured with a depression 208 sized in depth and diameter to receive the flange 210 of an auger shaft 48 therein. A plurality of apertures 212 are formed through the thickness of the auger shaft adaptor 202 through which bolts 216 are secured to firmly attach the flange 210 of the auger to the auger shaft adaptor 202. The auger shaft adaptor 202 may also be formed with a raised landing 218, the diameter of which is sized to be received in the bore 220 of the auger shaft 48 to securely engage the auger shaft 48 therewith.

The auger shaft adaptor 202 is also configured with a shaft 224 which is sized to be received into a bore 226 (FIG. 19) formed in the lip seal housing 204. The bore 224 of the lip seal housing 204 is surrounded by a recessed shoulder 230 the internal diameter of which is greater than the internal diameter of the bore 224. A lip seal 206 is provided for positioning in the recessed shoulder 230 of the lip seal housing 204. The external diameter of the lip seal 206 is comparable to the internal diameter of the recessed shoulder 230 and the internal diameter of the lip seal 206 is sized to be receivable about the shaft 224 of the auger shaft adaptor 202 to provide a snug fit therebetween. As the auger shaft 48 rotates, the lip seal 206 moves with the auger shaft 48 and rotates in the recessed shoulder 230 of the lip seal housing 204, which is stationary. The auger shaft adapter 202 and lip seal housing 204 are preferably made of an ultra high molecular weight (UHMW) plastic which imparts durability to the bearing assembly 200. The lip seal 206 is preferably made of graphite or a similar material. The lip seal housing 204 may preferably be structured with a lift-out handle 234 oriented toward the top of the lip seal housing 204 which may be grasped for removal of the bearing assembly 200 from the tank body. The lift-out handle 234 may also be formed with an eye 236 through which a hook or finger may be positioned to help leverage the bearing assembly for lifting. The auger shaft adaptor 202 described and illustrated herein is but one exemplar configuration for such as adaptor, other designs or configurations being possible.

The grit classifier of the present invention is structured to be easily and cost-effectively manufactured to reduce the overall cost of construction and to reduce the cost of transportation of the grit classifier to a site. The grit classifier of the present invention has significant advantages over conventionally-made grit classifiers, as described previously. The grit classifier can be adapted in size, shape and configuration to meet the specific requirements of any number of industrial applications. Hence, reference herein to specific details of the structure and function of the invention is by reference only and not by way of limitation. Those skilled in the art will recognize that changes may be made to the invention to adapt it to a variety of applications.

What is claimed is:

1. A unitarily-formed grit classifier tank comprising:
    an elongated tank body unitarily-formed from lightweight, corrosion-resistant, non-metallic material to provide durability under abrasive operating conditions and having a bottom, a continuous upstanding wall, a first end and a second end elevated above said first end, wherein at least a portion of said elongated tank comprises parallel, spaced-apart walls providing a confined void for filling with a substance to provide ballasting to said tank;
    said elongated tank body having a pool section formed at said first end thereof;
    said elongated tank body having a grit drainage section formed near said second end thereof and positioned to be spaced apart from said pool section;
    a fluid outlet formed in said pool section; and
    a solids discharge outlet formed in said grit drainage section.

2. The unitarily-formed grit classifier of claim 1 further comprising a feed slurry inlet.

3. The unitarily-formed grit classifier of claim 2 wherein said feed slurry inlet is positioned to deliver feed slurry into said pool section intermediate to said first end and said second end.

4. The unitarily-formed grit classifier of claim 1 further comprising a launder unitarily formed with said elongated tank at said first end thereof and positioned to receive fluid from said pool section.

5. The unitarily-formed grit classifier of claim 4 wherein said launder has a bottom wall for retaining fluid therein and an outlet.

6. The unitarily-formed grit classifier of claim 1 wherein said fluid outlet in said pool section is formed through said elongated tank near said bottom thereof.

7. The unitarily-formed grit classifier of claim 1 wherein said continuous upstanding wall of said pool section of said elongated tank body is oriented at an angle to said bottom of said elongated tank body.

8. The unitarily-formed grit classifier tank of claim 1 wherein at least a portion of said continuous upstanding wall of said pool section is oriented substantially perpendicular to said bottom of said elongated tank body.

9. The unitarily-formed grit classifier tank of claim 1 further comprising support legs unitarily formed as an integral part of said elongated tank body.

10. The unitarily-formed grit classifier tank of claim 1 further comprising a weir support unitarily formed with said tank and positioned at said first end adjacent said pool section of said elongated tank body.

11. The unitarily-formed grit classifier tank of claim 10 further comprising an upstanding weir supported by and unitarily formed with said continuous upstanding wall of said elongated tank body.

12. The unitarily-formed grit classifier tank of claim 10 wherein said elongated tank body is further configured with at least one weir bracket member unitarily formed therewith for supporting an upstanding weir in registration with said weir support.

13. The unitarily-formed grit classifier tank of claim 1 further comprising a sluice water return channel formed longitudinally in and extending away from said bottom of said tank in said grit drainage section thereof to return water and solids from said grit drainage section to said pool section.

14. The unitarily-formed grit classifier tank of claim 1 wherein said elongated tank body is formed with an end wall at said first end thereof, said end wall having an inner surface oriented toward said pool section, and wherein said elongated tank further comprises a bearing channel formed in said elongated tank body along an inner surface of said end wall for supporting an auger bearing assembly connected to a screw auger.

15. The unitarily-formed grit classifier tank of claim 1 wherein said bottom of said elongated tank body comprises two spaced apart walls forming a fillable confined void therebetween.

16. The unitarily-formed grit classifier tank of claim 1 wherein said continuous upstanding wall and said bottom of said elongated tank body both comprise two spaced apart walls forming a fillable void therebetween.

17. The unitarily-formed grit classifier tank of claim 1 wherein said elongated tank body further comprises support legs unitarily formed therewith.

18. A unitarily-formed grit classifier tank comprising:
an elongated tank body unitarily-formed from lightweight, corrosion-resistant, non-metallic material having a bottom, a continuous upstanding wall, a first end and a second end elevated above said first end;
said elongated tank body having a pool section formed at said first end thereof;
said elongated tank body having a grit drainage section formed near said second end thereof and positioned to be spaced apart from said pool section to provide dewatering of grit;
a fluid inlet positioned to deliver feed slurry to said pool section at an intermediate point between said first end and said second end of said elongated tank body;
a fluid outlet formed in said pool section; and
a solids discharge outlet formed in said grit drainage section.

19. The unitarily-formed grit classifier tank of claim 18 wherein said elongated tank body is structured with a sluice water return channel formed in and extending downwardly from said bottom of said elongated tank and longitudinally oriented in said grit drainage section to redirect slurry water and solids from said grit drainage section to said pool section.

20. The unitarily-formed grit classifier tank of claim 18 further comprising a launder unitarily formed with said elongated tank body and positioned at said first end thereof to receive fluid from said pool section.

21. The unitarily-formed grit classifier tank of claim 18 wherein said fluid outlet is positioned through said elongated tank body near said bottom thereof.

22. The unitarily-formed grit classifier tank of claim 18 further comprising a weir support unitarily formed with said elongated tank body to support a weir member in a position to receive fluid from said pool section.

23. The unitarily-formed grit classifier tank of claim 18 wherein said elongated tank body is formed with an end wall at said first end thereof, said end wall having an inner surface oriented toward said pool section, and wherein said elongated tank further comprises a bearing channel formed in said elongated tank body along an inner surface of said end wall for supporting an auger bearing assembly connected to a screw auger.

24. The unitarily-formed grit classifier tank of claim 18 wherein at least a portion of said elongated tank further comprises parallel spaced-apart walls providing a confined void tillable with a substance which provides ballasting support to said tank.

25. A unitarily-formed grit classifier tank comprising:
a unitarily-formed elongated tank body formed of lightweight, corrosion-resistant non-metallic material to provide durability during abrasive operating conditions and having a first end and a second end elevated above said first end, a flattened bottom, and a continuous upstanding wall extending from said bottom, said continuous upstanding wall further comprising at least one section oriented at an angle to said bottom and at least one section oriented perpendicular to said bottom;
said elongated tank body having a pool section formed at said first end thereof;
said elongated tank body having a grit drainage section formed near said second end thereof and positioned to be spaced apart from said pool section;
a feed slurry inlet positioned to introduce feed slurry into said pool section intermediate to said first end and said second end of said elongated tank body;
a fluid outlet formed in said pool section in proximity to said bottom of said tank; and
a solids discharge outlet formed in said grit drainage section.

26. The unitarily-formed grit classifier tank of claim 25 further comprising a launder unitarily formed with said elongated tank body and positioned at said first end thereof to receive fluid from said pool section.

27. The unitarily-formed grit classifier tank of claim 25 further comprising a sluice water return channel formed longitudinally in and extending downwardly from said bottom in said grit drainage section to redirect water and solids from said drainage section to said pool section.

28. The unitarily-formed grit classifier tank of claim 25 further comprising a weir support unitarily formed with said elongated tank body to support a weir member in a position to receive thereover fluid from said pool section.

29. The unitarily-formed grit classifier tank of claim 28 further comprising an upstanding weir supported by and unitarily formed with said continuous upstanding wall of said elongated tank body.

30. The unitarily-formed grit classifier tank of claim 28 wherein said elongated tank body is further configured with at least one weir bracket member unitarily formed therewith for supporting an upstanding weir in registration with said weir support.

31. The unitarily-formed grit classifier tank of claim 25 wherein said elongated tank body is formed with an end wall at said first end thereof, said end wall having an inner surface oriented toward said pool section, and wherein said elongated tank further comprises a bearing channel formed in said elongated tank body along an inner surface of said end wall for supporting an auger bearing assembly connected to a screw auger.

32. A unitarily-formed grit classifier tank comprising:

a unitarily-formed elongated tank body formed of lightweight, corrosion-resistant non-metallic material and having a bottom, a continuous upstanding wall, a first end and a second end elevated above said first end;

said elongated tank body having a pool section formed at said first end thereof;

said elongated tank body having a grit drainage section formed near said second end thereof and positioned to be spaced apart from said pool section;

a feed slurry inlet positioned to introduce feed slurry into said pool section intermediate to said first end and said second end of said elongated tank body;

a fluid outlet formed in said pool section;

a solids discharge outlet formed in said grit drainage section; and weir support structure positioned at said first end of said elongated tank and unitarily-formed therewith for receiving a weir member in said pool section downstream from said feed slurry inlet.

33. The unitarily-formed grit classifier tank of claim 32 further comprising at least one weir support bracket unitarily formed with said elongated tank body and positioned adjacent said weir support to receive a weir member therein.

34. The unitarily-formed grit classifier tank of claim 32 wherein said elongated tank body is formed with an end wall at said first end thereof, said end wall having an inner surface oriented toward said pool section, and wherein said elongated tank further comprises a bearing channel formed in said elongated tank body along an inner surface of said end wall for supporting an auger bearing assembly connected to a screw auger.

35. The unitarily-formed grit classifier tank of claim 34 further comprising a sluice water return channel longitudinally-formed in said grit drainage section to return water and solids from said drainage section to said pool section.

36. The unitarily-formed grit classifier tank of claim 32 further comprising a launder unitarily formed with said elongated tank at said first end thereof and positioned to be in fluid communication with said pool section.

37. A unitarily-formed grit classifier tank comprising:

a unitarily-formed elongated tank body of lightweight, durable non-metallic material to provide durability under abrasive operating conditions having a bottom, a continuous upstanding wall, a first end and a second end elevated above said first end;

said elongated tank body having a pool section formed at said first end thereof;

said elongated tank body having a grit drainage section formed near said second end thereof and positioned to be spaced apart from said pool section;

a sluice water return channel formed in said bottom of said elongated tank body in said grit drainage section thereof to redirect separated water and solids from said drainage section to said pool section;

a fluid outlet formed in said pool section; and a solids discharge outlet formed in said grit drainage section.

38. The unitarily-formed grit classifier tank of claim 37 further comprising a launder positioned to be in fluid communication with said pool section.

39. The unitarily-formed grit classifier tank of claim 37 further comprising a feed slurry inlet positioned to introduce feed slurry into said pool section intermediate to said first end and said second end of said elongated tank body.

40. A grit classifier tank assembly comprising:

an elongated tank body unitarily formed of lightweight, durable non-metallic material having a bottom, a continuous upstanding wall, a first end and a second end, said elongated tank body having a pool section formed near said first end;

a fluid outlet formed in said pool section;

a tank extension for selectively extending said elongated tank in length to accommodate variable lengths of screw augers, said tank extension being unitarily formed of lightweight, durable non-metallic material comprising a bottom, an upstanding wall and an end wall which define a grit drainage section, said tank extension being adapted for connection to said unitarily-formed elongated tank body at said second end thereof and having an opening formed through said end wall to receive a screw auger shaft therethrough; and a solids discharge outlet formed in said tank extension.

41. The grit classifier tank assembly of claim 40 wherein said unitarily-formed tank extension further comprises at least one leg support unitarily-formed therewith for supporting said tank extension in elevation above said first end of said tank body.

42. The grit classifier tank assembly of claim 40 wherein said tank body is further comprised of at least one feed slurry box unitarily-formed with said tank body and positioned between said first end and said discharge outlet to introduce a feed slurry into said pool section of said tank body.

43. The grit classifier tank assembly of claim 40 configured with securement members unitarily-formed with said tank to lockingly engage said tank extension in registration with said tank body.

44. The grit classifier tank assembly of claim 40 wherein at least a portion of said elongated tank body comprises parallel, spaced-apart walls providing a confined void for filing with a substance to provide ballasting to said tank.

45. The grit classifier tank assembly of claim 40 wherein at least a portion of said tank extension comprises parallel, spaced-apart walls providing a confined void for filing with a substance to provide ballasting to said tank.

* * * * *